(12) United States Patent
Hori

(10) Patent No.: US 7,804,570 B2
(45) Date of Patent: Sep. 28, 2010

(54) LIQUID CRYSTAL DISPLAY DEVICE INCLUDING SUPERPOSITION OF PIXEL ELECTRODES AND SIGNAL LINES

(75) Inventor: Yoichi Hori, Kounosu (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 312 days.

(21) Appl. No.: 12/031,353

(22) Filed: Feb. 14, 2008

(65) Prior Publication Data

US 2008/0239224 A1 Oct. 2, 2008

(30) Foreign Application Priority Data

Feb. 21, 2007 (JP) ............... 2007-040815

(51) Int. Cl.
*G02F 1/1343* (2006.01)
*G02F 1/1333* (2006.01)
*G02F 1/136* (2006.01)
(52) U.S. Cl. .............. 349/139; 349/146; 349/110; 349/44
(58) Field of Classification Search ........... 349/139, 349/146, 38, 39, 110, 44
See application file for complete search history.

(56) References Cited

U.S. PATENT DOCUMENTS 5,953,088 A * 9/1999 Hanazawa et al. .......... 349/110
6,307,215 B1 * 10/2001 den Boer et al. ............ 257/59
6,400,427 B1 * 6/2002 Hanazawa et al. ........... 349/44
7,548,295 B2 * 6/2009 Kawasaki et al. .......... 349/141

FOREIGN PATENT DOCUMENTS

JP 10-104664 4/1998
JP 2001-318390 11/2001

* cited by examiner

*Primary Examiner*—Mike Qi
(74) *Attorney, Agent, or Firm*—Finnegan, Henderson, Farabow, Garrett & Dunner, L.L.P.

(57) ABSTRACT

A liquid crystal display device includes an array substrate and an opposing substrate that are disposed face to face at a prescribed interval. The array substrate includes a scan line, signal lines, switching devices disposed at intersections between the scan line and the signal lines, pixel electrodes disposed in a matrix manner and driven by the switching devices and auxiliary capacitance lines for retaining applied voltage for the pixel electrodes. The pixel electrodes have side edges superposed on the signal lines or black matrices formed on the opposing substrate to achieve shielding of light, and the side edges have parts superposed on shield electrodes disposed on the auxiliary capacitance lines to make an amount of superposition between the pixel electrodes and the signal lines or the black matrices in a region corresponding to positions where the shield electrodes are disposed smaller than that in other regions.

4 Claims, 7 Drawing Sheets

[Fig. 1]
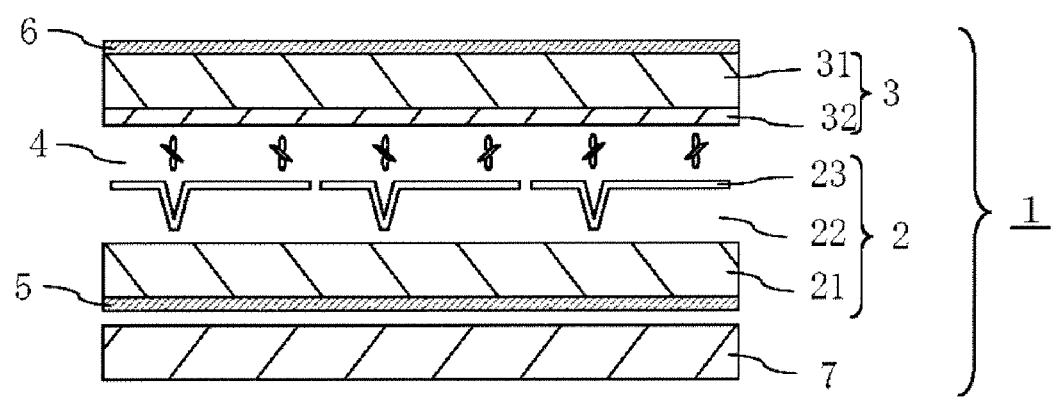

[Fig. 2]
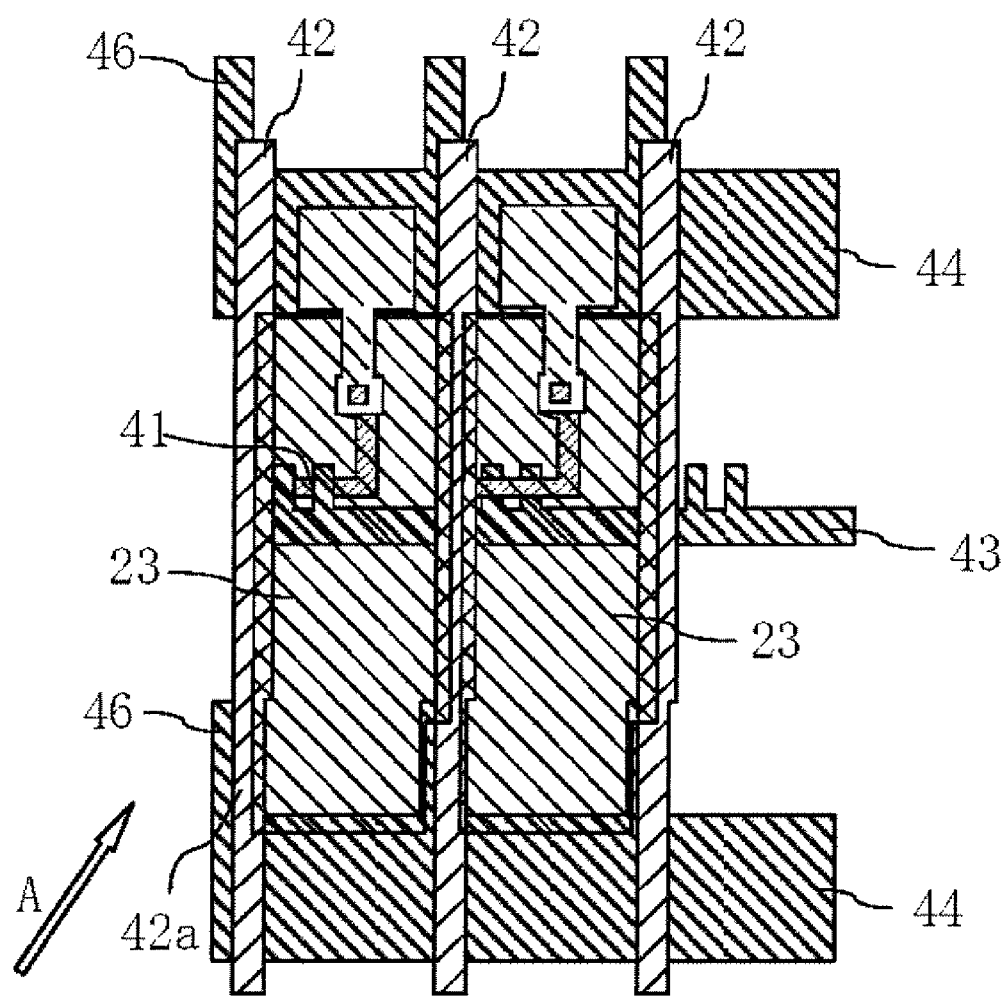

[Fig. 3]
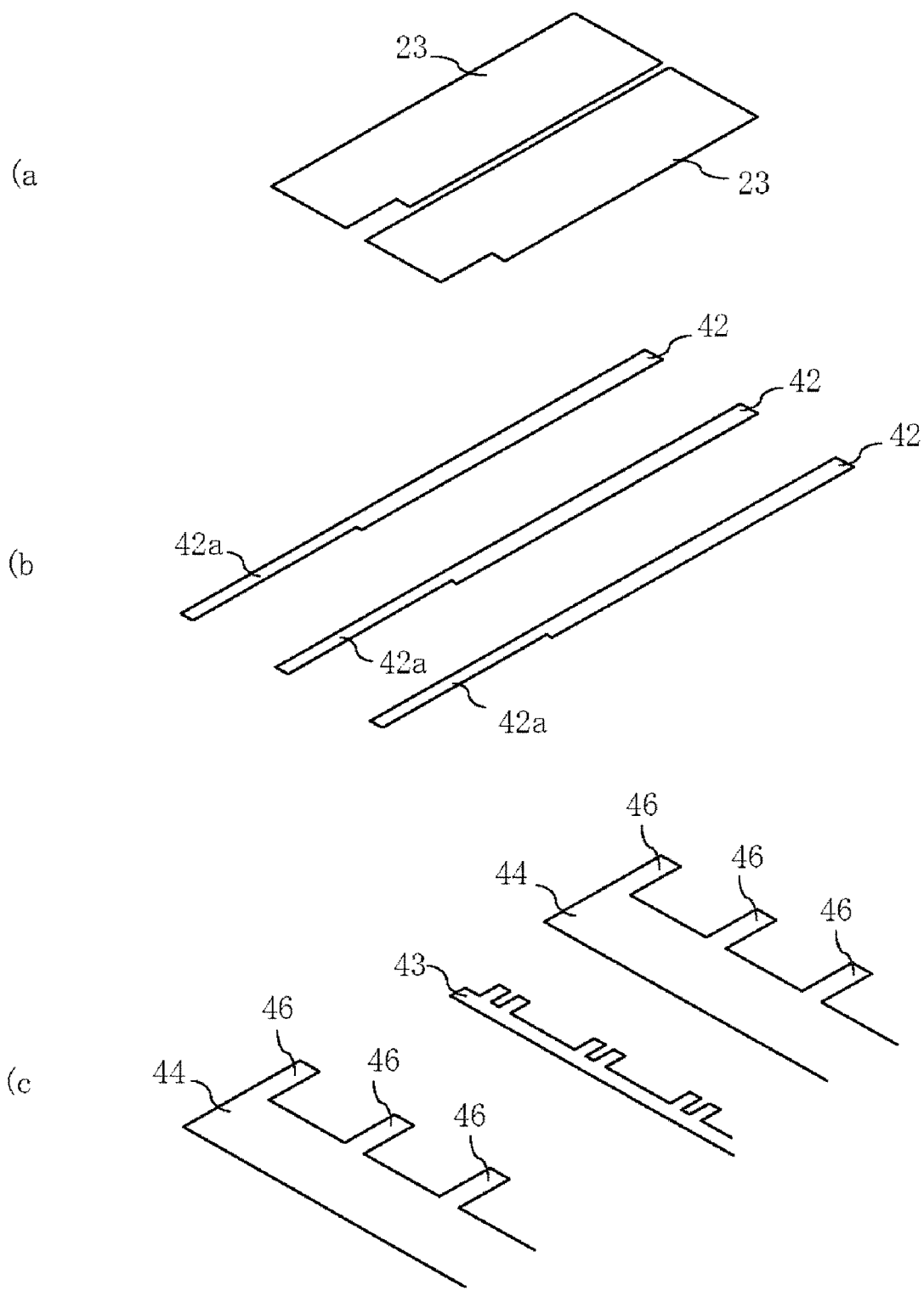

[Fig. 4]
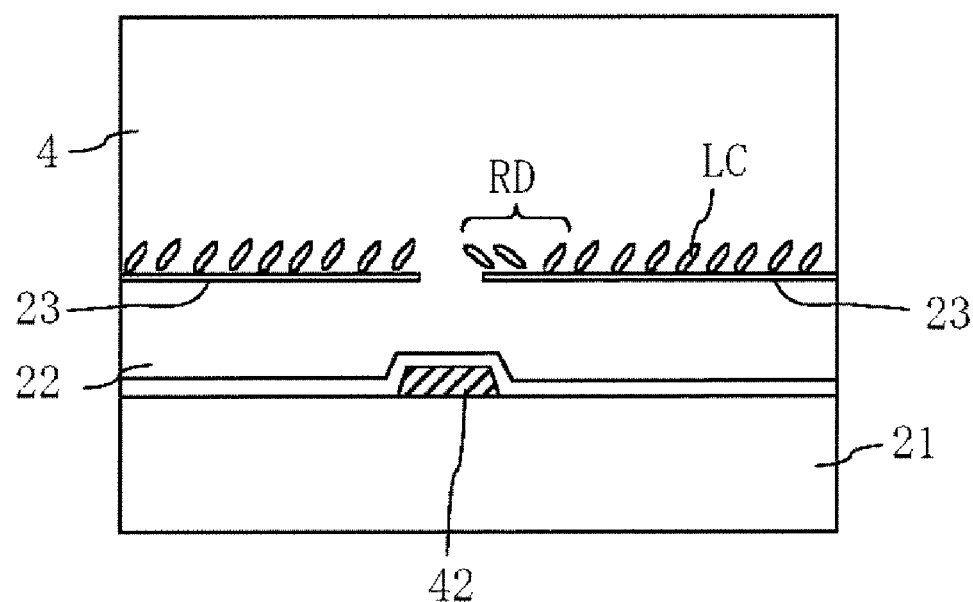

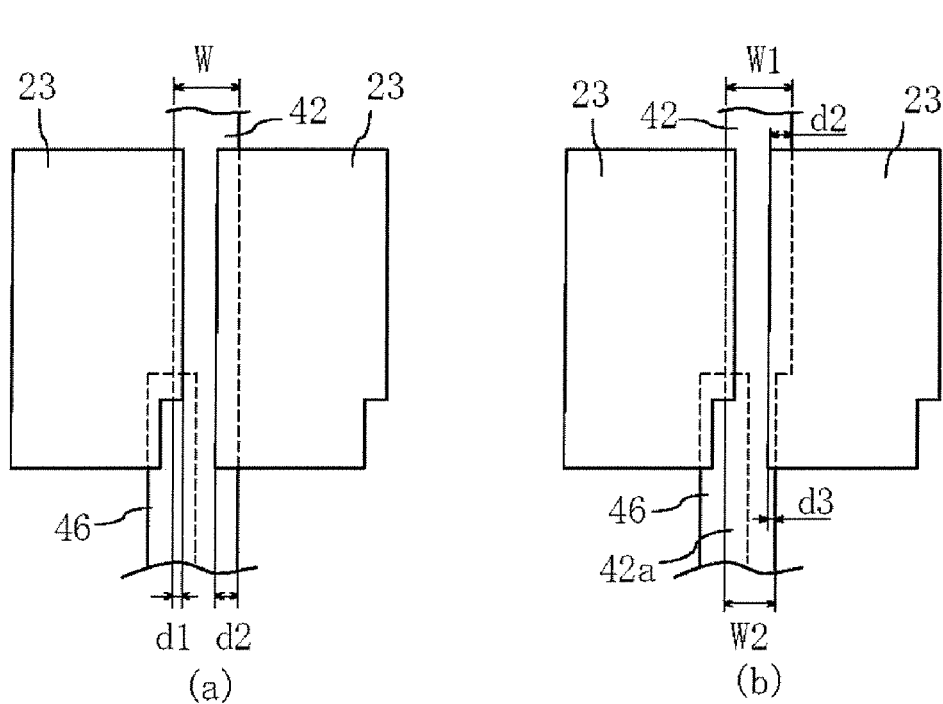
[Fig. 5]

[Fig. 6]
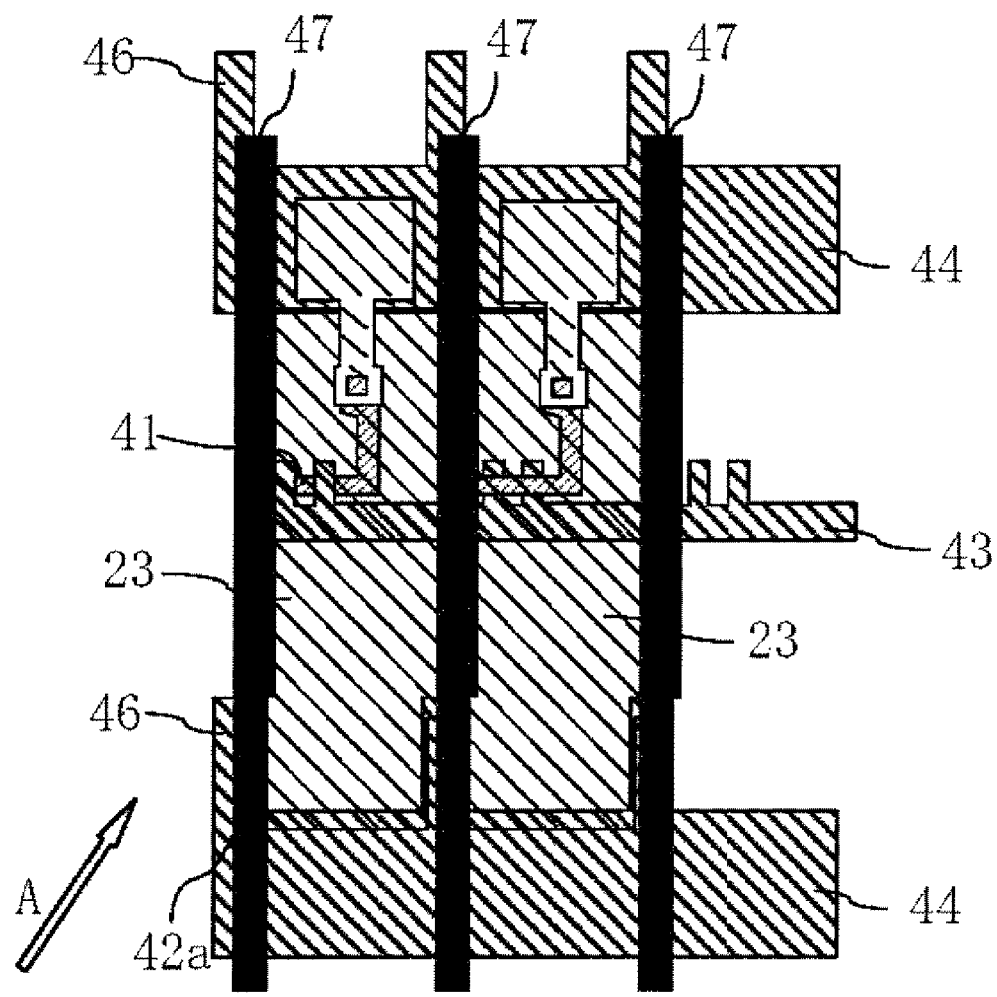

[Fig. 7]
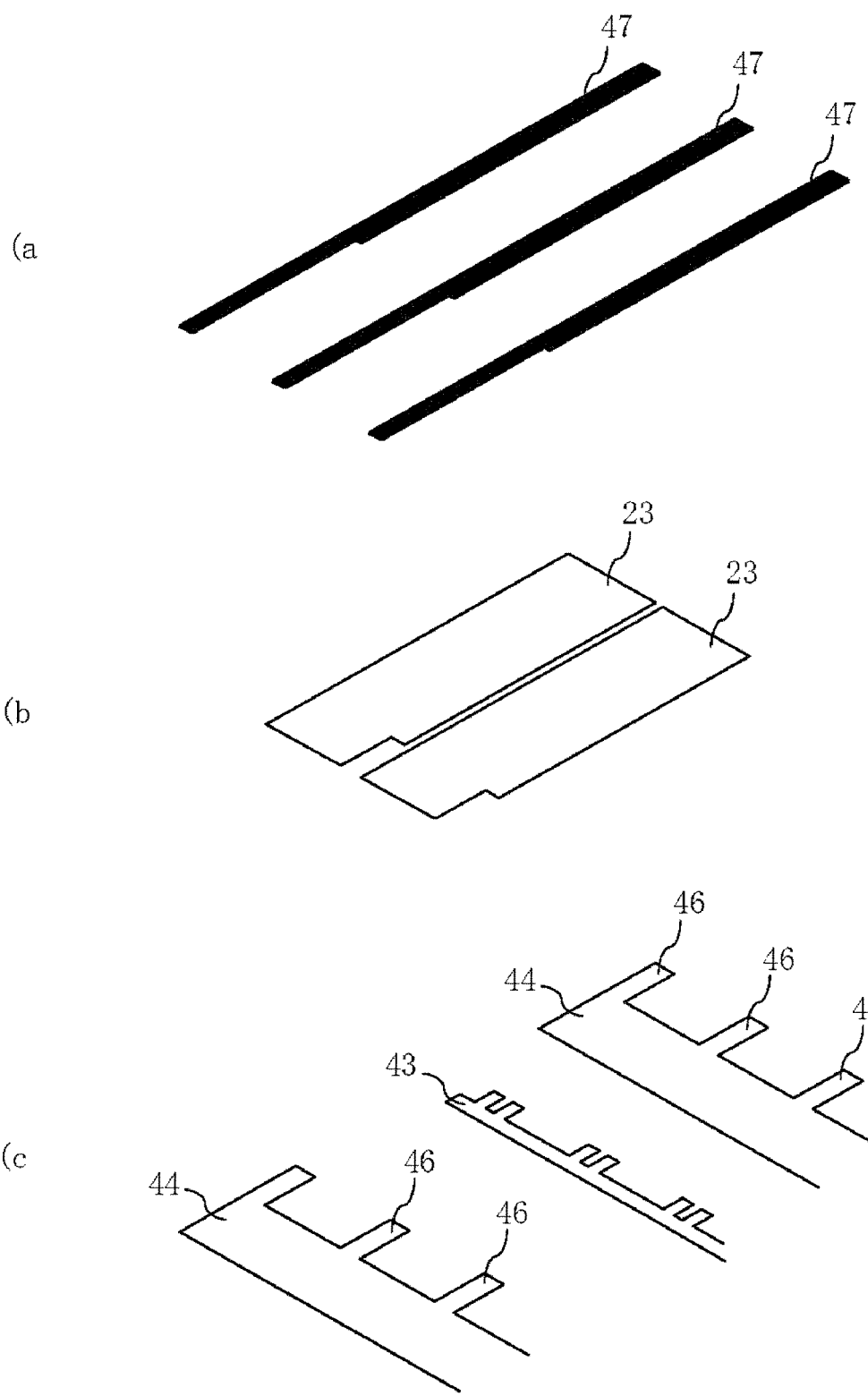

LIQUID CRYSTAL DISPLAY DEVICE INCLUDING SUPERPOSITION OF PIXEL ELECTRODES AND SIGNAL LINES

BACKGROUND OF THE INVENTION

1. Field of the Invention

The present invention relates to a liquid crystal display device and particularly to a novel structure capable of infallibly light-shielding a reverse region and enhancing an aperture ratio.

2. Description of Prior Art

For example, a liquid crystal display device that is one of planar display devices has been utilized in various fields, such as OA equipment, information terminals, watches, television sets, etc., because it has features of lightweight, small thickness, low power consumption, etc. In particular, since a liquid crystal display device using a thin film transistor device (TFT device) is excellent in response, it has been used as a display device in a great number of electronic devices including mobile telephones, television sets, computers, etc.

In the liquid crystal display device, an array substrate and an opposing substrate are disposed face to face at a prescribed interval to constitute a liquid crystal cell. In an active matrix liquid crystal display device, for example, pixel electrodes disposed in a matrix manner on an array substrate causes liquid crystal materials injected into the liquid crystal cell to be driven, thereby displaying images, letters, etc.

In the meantime, in the active matrix liquid crystal device, the array substrate is formed thereon with a scan line and signal lines disposed in rows and columns. Thin film transistors are disposed as switching devices at the intersections between the scan line and the signal lines. The switching devices drive the pixel electrodes. In addition, the array substrate is also formed thereon with an auxiliary capacitance line for retaining applied voltage for the pixel electrodes.

When adopting the configuration described above, there arises a so-called reverse tilt domain problem to necessitate the reverse region to be light-shielded. The reverse tilt domain is a domain caused by the inversion of pretilt angle resulting from an orientation disturbance of a liquid crystal produced by an electric field between adjacent pixel electrodes when performing a gate line inversion drive or a source line inversion drive, a dot inversion drive, etc. and constitutes a case of deteriorating the visual quality.

In view of the above, studies have been made on the concealment of the reverse tilt domain to prevent a decrease in visual quality, and superposition of pixel electrodes and signal lines is utilized to light-shield the reverse region (refer, for example, to JP-A HEI 10-104664 and JP-A 2001-318390).

In the invention described in JP-A HEI 10-104664, the width of superposition between the pixel electrode and the gate signal line positioned in the orientation direction of the liquid crystal molecules is made larger than that positioned in the inverse direction, and the width of superposition between the pixel electrode and the source signal line positioned in the orientation direction of the liquid crystal molecules is made larger than that in the inverse direction, to suppress a decrease in aperture ratio and make the visual quality excellent.

JP-A 2001-318390 discloses an active matrix liquid crystal display device wherein the side edge of a display pixel electrode disposed between a pair of adjacent image signal lines is superposed on the side edge of each image signal line, the width of superposition of one of the image signal lines is made larger than that of the other image signal line, and the other image signal line is connected via a switching device to the corresponding display image electrode. It further discloses that an auxiliary capacitance line is provided with a shield electrode on which a peripheral part of the display pixel electrode is superposed.

When adopting the configuration in which the pixel electrode is superposed on the signal line to light-shield the reverse region, as described in each of the prior art references, a decrease in aperture ratio is unavoidable. Particularly, when the width of the superposition between the pixel electrode and the signal line is made wider, it is the problem how the aperture ratio should be made large.

The present invention has been proposed in view of the above problem, and the object thereof is to provide a liquid crystal display device capable of minimizing the decrease in aperture ratio and excellent in visual quality.

SUMMARY OF THE INVENTION

To attain the above object, the present invention provides a liquid crystal display device comprising an array substrate and an opposing substrate that are disposed face to face at a prescribed interval, the array substrate comprising scan lines, signal lines, switching devices disposed at each intersection between the scan lines and the signal lines, pixel electrodes disposed in a matrix manner and driven by the switching devices and auxiliary capacitance lines for retaining applied voltage for the pixel electrodes, wherein the pixel electrodes have side edges superposed on the signal lines (or black matrices formed on the opposing substrate) to achieve shielding of light, and the side edges have parts superposed on shield electrodes disposed on the auxiliary capacitance lines to make an amount of superposition between the pixel electrodes and the signal lines (or the black matrices) in a region corresponding to positions where the shield electrodes are disposed smaller than that in other regions.

In the liquid crystal display device of the present invention, the auxiliary capacitance line is provided with the shield electrodes that are superposed on part of the side edges of the pixel electrodes. The shield electrodes are provided for balancing the coupling capacitance between the adjacent pixels.

Here, it has been found that the reverse tilt domain in the region where the shield electrodes exist is smaller than that in the region where no shield electrode exists. When, under these circumstances, the signal line or black matrix is straightened to make the amount of superposition thereof on the pixel electrode uniform, the pixel electrode is greatly concealed over the reverse region at the shield electrode formation position. As a result, the aperture ratio is unduly decreased.

In the present invention, therefore, the width of superposition between the pixel electrode and the signal line (or black matrix) is made small in the region corresponding to the shield electrode formation position, i.e. at the portion adjacent to the shield electrode, to suppress a decrease in aperture ratio to the necessity minimum. At the portion adjacent to shield electrode, since the reverse tilt domain is small, it can be concealed even when the width of superposition between the pixel electrode and the signal line or black matrix is made small, and the visual quality will not be lowered. In addition, making the width of superposition small results in the enhancement in aperture ratio.

According to the present invention, since it is possible to minimize the decrease in aperture ratio and to infallibly light-shield the reverse region in which the reverse tilt domain has been formed, through the concealment by the superposition between the pixel electrode and the signal line or black matrix, it is made possible to provide a liquid crystal display device excellent in visual quality.

The above and other objects, characteristic features and advantages will become apparent to those skilled in the art from the description to be given herein below with reference to the accompanying drawings.

BRIEF DESCRIPTION OF THE DRAWINGS

FIG. 1 is a schematic cross section showing one example of liquid crystal display device according to the present invention.

FIG. 2 is a schematic plan view showing one example of pixel structure according to the present invention.

FIG. 3 is a schematic perspective view showing the order of stacking to constitute the pixel structure shown in FIG. 2, FIG. 3(a) being a perspective view showing the pixel electrodes, FIG. 3(b) being a perspective view showing the signal lines and FIG. 3(c) being a perspective view showing the gate lines and auxiliary capacitance line.

FIG. 4 is a schematic view explaining a reverse tilt domain.

FIG. 5 is a plan view of the principal part in the state of superposition between the signal lines and the pixel electrodes, FIG. 5(a) showing the state wherein the width of the signal line is made uniform and FIG. 5(b) showing the state wherein the width of the portion of the signal line adjacent to the shield electrode is made smaller.

FIG. 6 is a schematic plan view showing a pixel structure in which the black matrices light-shield the intervals between the pixel electrodes.

FIG. 7 is a schematic perspective view showing the order of stacking to constitute the pixel structure shown in FIG. 6(a), FIG. 7(a) being a perspective view showing the black matrices, FIG. 7(b) being a perspective view showing the pixel electrodes and FIG. 7(c) being a perspective view showing the gate line and auxiliary capacitance lines.

DETAILED DESCRIPTION OF PREFERRED EMBODIMENTS

The liquid crystal display device according to the present invention will be described in detail with reference to the accompanying drawings.

FIG. 1 shows one example of liquid crystal display 1. In the liquid crystal display 1, a pair of optically transparent insulating substrates (glass substrates) constitutes a liquid crystal cell, and a liquid crystal material is sealed in between the substrates to form a liquid crystal layer. Specifically, a liquid crystal layer 4 is sealed in between an array substrate 2 and an opposing substrate 3.

The array substrate 2 uses a glass substrate 21 as a support substrate on which scan lines arranged substantially in parallel to each other and equidistantly, signal lines arranged substantially orthogonal to the scan lines, interlayer insulation films (transparent insulating films) 22 interposing between the scan lines and the signal lines to electrically insulate these lines and pixel transistors (thin film transistors: TFTs) disposed as switching devices in the vicinity of the intersections between the scan lines and signal lines are formed.

Also in the array substrate 2, pixel electrodes 23 connected electrically to the switching devices via through holes formed in the interlayer insulation films 22 are formed as disposed in a matrix manner. The pixel electrodes 23 are transparent. Incidentally, between the glass substrate 21 of the array substrate 2 and the pixel electrodes 23 disposed are, besides the interlayer insulation films 22, the aforementioned signal lines, scan lines and pixel transistors that are omitted from FIG. 1. Furthermore, while an oriented film is formed on substantially entire surface of the array substrate 2 on which the pixel electrodes 23 are disposed, it is also omitted from FIG. 1.

On the other hand, the opposing substrate 3 also uses a glass substrate 31 as a support substrate and is provided on the surface thereof on the side of the liquid crystal layer with a color filter layer 32 corresponding to each pixel, the entire surface of which is coated with a transparent opposing electrode (not shown) formed of a transparent conductive material, such as ITO. The color filter layer 32 is a resin layer colored with pigments or dyes and is constituted by a combination of R, G and B color filter layers, for example. Though not shown, so-called black matrix layers are formed at the pixel boundaries of the color filter layers 32 for the purpose of enhancing the contrast.

The liquid crystal display device 1 having the above configuration has polarization plates 5 and 6 on the outer sides of the array substrate 2 and the opposing substrate 3, respectively, and displays images thereon, with a backlight 7 disposed on the backside as a light source. In addition, the array substrate 2 and the opposing substrate 3 are disposed, with the former on the backside and the latter on the front side. In the liquid crystal display device 1 according to the present embodiment, therefore, the backlight 7, polarization plate 5, array substrate 2, liquid crystal layer 4, opposing substrate 3 and polarization plate 6 are disposed in the order mentioned from the backside.

In the liquid crystal display device of this type, a scan line driving circuit is used to scan the scan lines sequentially from the upper stage, and a voltage for bringing the pixel transistors (switching devices) connected to the same scan line to an ON or OFF state is applied to the relevant scan line. When the pixel transistors connected to the same scan line has been brought to an ON state, a signal line driving circuit is used to apply a voltage corresponding to signals of images to be displayed to the signal line, thereby applying a desired voltage to the storage capacitor and the liquid crystal layer 4 via the pixel transistors. On the other hand, when the pixel transistors connected to the same scan line has been brought to an OFF state, the voltage applied to the storage capacitor and the liquid crystal layer 4 is retained until the next scanning. This scanning is sequentially carried out relative to the scan lines to bring the pixel transistors connected to the relevant scan lines to an ON state, thereby displaying the entire image plane.

FIGS. 2 and 3 show the pixel structure of the liquid crystal display device for display the aforementioned image. Incidentally, FIG. 2 is a plan view and FIG. 3 an exploded perspective view showing the order of stacking.

On the array substrate 2, as shown in FIGS. 2 and 3, pixel electrodes 23 corresponding to the pixels are formed and, at the same time, pixel transistors 41 that are switching devices for driving the pixel electrodes 23, signal lines 42, a scan line (gate line 43 here) and auxiliary capacitance lines 44 are formed. Incidentally, the pixel transistors 41 are arranged as disposed at the intersections between the signal lines 42 and the gate line 43.

Furthermore, the auxiliary capacitance lines 44 are provided with shield electrodes 46 projecting in substantially the same direction as that of the formation of the signal lines 42. The shield electrodes 46 are provided for balancing the coupling capacitance between the adjacent pixels and superposed parts of the side edges of the pixel electrodes 23.

In this pixel structure, when the orientation direction is that indicate by arrow A in FIG. 2, for example, a reverse tilt domain for reversing the orientation direction of liquid crystal molecules LC toward the downstream side edge of the signal line 42 is generated as shown in FIG. 4 to form a reverse region RD. Since normal display is not attained in the reverse region RD, the formation of the reverse region constitutes a case of deteriorating the visual quality.

Generally, light shielding between the adjacent pixel electrodes 23 is performed utilizing a signal line having no optical transparency, and the amount of superposition thereof on the pixel electrode 23 on the side of the signal line 42 on which the reverse region RD is formed is made larger to conceal the reverse region RD, thereby eliminating the deterioration of the visual quality. That is to say, as shown in FIG. 5(a), the opposite side edges of the signal line 42 are superposed on the side edges of the adjacent pixel electrodes 23 to light-shield the region between the adjacent pixel electrodes 23 and simultaneously cover the reverse region RD. In this case, in view of the region in which the reverse region RD is formed, the amount d2 of superposition on the right-side pixel electrode 23 in FIG. 5(a) is made larger than the amount d1 of superposition on the left-side pixel electrode 23 to enable the reverse region RD to be infallibly covered.

Here, since the width W of the signal line 42 is generally made uniform, the amount d2 of superposition thereof on the pixel electrode 23 is uniform. In the case where the auxiliary capacitance line 44 is provided with the shield electrode 46, however, the width of the reverse region RD formed in the region adjacent to the shield electrode corresponding to the shield electrode formation region is smaller than that in the region in which no shield electrode exists. Therefore, when the width W of the signal line 42 has been made uniform to make the amount d2 of superposition on the pixel electrode 23 uniform, the pixel electrode 23 is covered more than necessary. Covering to conceal the pixel electrode 23 more than necessary will result in reduction of aperture ratio.

In the present embodiment, therefore, as shown in FIG. 5(b), the width of the signal line 42 is made different in the region thereof adjacent to the shield electrode 46 from that in other regions to make the amount of superposition on the pixel electrode 23 smaller. To be specific, when the width of the signal line 42 not adjacent to the shield electrode 46 is denoted by W1 and the width of the signal line 42a adjacent to the shield electrode 46 by W2, the widths are set to satisfy W1>W2. In other words, the portion of the signal line 42 in the region adjacent to the shield electrode 46 superposed on the right-side pixel electrode 23 in FIG. 5(b) disposed on the downstream side of the orientation direction A is cut off by a prescribed width (W1−W2) so that the width W2 of the signal line 42 may be smaller than the width W1 thereof in the region in which no shield electrode 42 exists.

As a result, the width d3 of superposition between the signal line 42a and the pixel electrode 23 in the region adjacent to the shield electrode 46 becomes smaller than the width d2 of superposition between the signal line 42 and the pixel electrode 23 in the region not adjacent to the shield electrode 46 to enhance the aperture ratio by the smaller amount.

Incidentally, since it has been confirmed that the width of formation of the reverse region RD in the region corresponding to the shield electrode formation region is smaller by 0.5 µm to 1.0 µm than that in the region having no shield electrode 46, the difference in width (W1−W2) of the signal line, i.e. the difference in amount of superposition (d2−d3) is preferably in the range of 0.5 µm to 1.0 µm.

By the aforementioned electrode design, it is made possible to realize a liquid crystal display device excellent in visual quality while minimizing the reduction in aperture ratio.

Though the embodiments of the present invention have been described above, it goes without saying that the present invention is not limited to the embodiments and can variously be modified. While the embodiment has been described citing the case where the signal line 42 is used to light-shield the interval between the adjacent pixel electrodes 23, it may be adopted, for example, that black matrices may be provided on the side of the opposing substrate 3 to light-shield the interval between the adjacent pixel electrodes 23.

FIGS. 6 and 7 show that the present invention is applied to the case where black matrices 47 formed on the opposing substrate 3 are used to light-shield the interval between the adjacent pixel electrodes 23. Also in the case where the black matrices 47 are used to light-shield the interval between the adjacent pixel electrodes 23, the amount of superposition between the black matrix 47 and the pixel electrode 23 is made larger in order to conceal the reverse region RD. Similarly to the case of the signal line 42, the width of the black matrix 47 is varied, to the effect that when the width of the black matrix 47 in the region not opposed to the shield electrode 46 is denoted by W3 and the width of the black matrix 47 in the region opposed to the shield electrode 46 by W4, the widths are set to satisfy W3>W4.

Thus, the amount of superposition between the black matrix 47 and the pixel electrode 23 in the region opposed to the shield electrode 46 is made smaller than the amount of superposition between the black matrix 47 and the pixel electrode 23 in the region not opposed to the shield electrode 46 to enable the aperture ratio to be enhanced. In addition, there is no case where the problem of lowering the visual quality will be posed.

What is claimed is:

1. A liquid crystal display device comprising an array substrate and an opposing substrate that are disposed face to face at a prescribed interval,
   the array substrate comprising scan lines, signal lines, switching devices disposed at each intersection between the scan lines and the signal lines, pixel electrodes disposed in a matrix manner and driven by the switching devices, and auxiliary capacitance lines for retaining applied voltage for the pixel electrodes,
   wherein the pixel electrodes have first side edges superposed on the signal lines and on shield electrodes disposed on the auxiliary capacitance lines to achieve shielding of light, and have second side edges opposite to the first side edges, the second side edges superposed on the signal lines to make an amount of superposition between the pixel electrodes and the signal lines, the amount of superposition having a first superposition width in a region corresponding to positions where the shield electrodes are disposed and a second superposition width in a region corresponding to positions where the shield electrodes are not disposed, the first superposition width being smaller than the second superposition width.

2. A liquid crystal display device according to claim 1, wherein the signal lines have a first line width in the region corresponding to positions where the shield electrodes are disposed and a second line width in the region corresponding to positions where the shield electrodes are not disposed, the first line width being smaller than the second line width.

3. A liquid crystal display device comprising an array substrate and an opposing substrate that are disposed face to face at a prescribed interval,
   the array substrate comprising scan lines, signal lines, switching devices disposed at each intersection between the scan lines and the signal lines, pixel electrodes disposed in a matrix manner and driven by the switching devices and auxiliary capacitance lines for retaining applied voltage for the pixel electrodes, wherein the pixel electrodes have side edges superposed on black matrices formed on the opposing substrate to achieve shielding of light, and the side edges have parts superposed on shield electrodes disposed on the auxiliary capacitance lines to make an amount of superposition between the pixel electrodes and the black matrices in a region corresponding to positions where the shield electrodes are disposed smaller than that in other regions.

4. A liquid crystal display device according to claim 3, wherein the black matrices have a width in the region corresponding to positions where the shield electrodes are disposed smaller than that in other regions.

* * * * *